United States Patent [19]
Hapke et al.

[11] Patent Number: 5,691,520
[45] Date of Patent: Nov. 25, 1997

[54] SELF ADJUSTING LID SWITCH

[75] Inventors: Kenyon A. Hapke, Libertyville, Ill.; David M. Howie, Waukesha; Spencer C. Schantz, Dousman, both of Wis.

[73] Assignee: U.S. Controls Corporation, New Berlin, Wis.

[21] Appl. No.: 569,467

[22] Filed: Dec. 8, 1995

[51] Int. Cl.⁶ .................................................. H01H 21/04
[52] U.S. Cl. ........................................ 200/61.62; 200/61.7
[58] Field of Search .......................... 68/12.26, 12.02, 68/12.06, 12.27, 23.1, 23.3; 192/136; 200/61.62, 61.7, 61.69, 61.76, 61.82, 61.81, 306, 522, 50.02, 50.1, 61.79, 61.8; 292/261, 201

[56] References Cited

U.S. PATENT DOCUMENTS

| | | | |
|---|---|---|---|
| 4,179,907 | 12/1979 | Schantz | 68/12 R |
| 4,286,811 | 9/1981 | Schantz | 292/201 |
| 4,995,650 | 2/1991 | Schantz et al. | 292/201 |
| 4,996,400 | 2/1991 | Ricci et al. | 200/345 |
| 5,050,407 | 9/1991 | Wild | 68/12.06 |
| 5,153,395 | 10/1992 | Schantz et al. | 200/61.62 |
| 5,440,086 | 8/1995 | Kropf | 200/61.62 |
| 5,520,026 | 5/1996 | Ackland | 68/12.26 |
| 5,600,976 | 2/1997 | Hapke et al. | 68/12.26 |

*Primary Examiner*—Michael L. Gellner
*Assistant Examiner*—Michael A. Friedhofer
*Attorney, Agent, or Firm*—Quarles & Brady

[57] ABSTRACT

A self-adjusting lid switch for a type washing machine connects the switch to the lid by means of a slip joint composed of intermeshing toothed plates spring biased together. The first time the washing lid is closed the plates slip with respect to each other so that the switch is just actuated when the lid is closed. In this way a limited and predictable lifting of the lid de-actuates the switch so as to stop the washing machine before access to the washing machine tub is obtained.

14 Claims, 5 Drawing Sheets

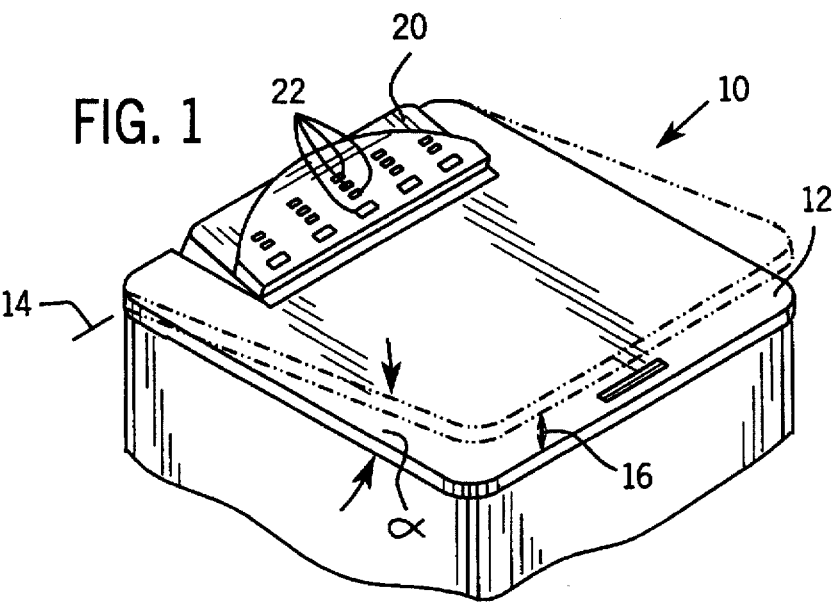
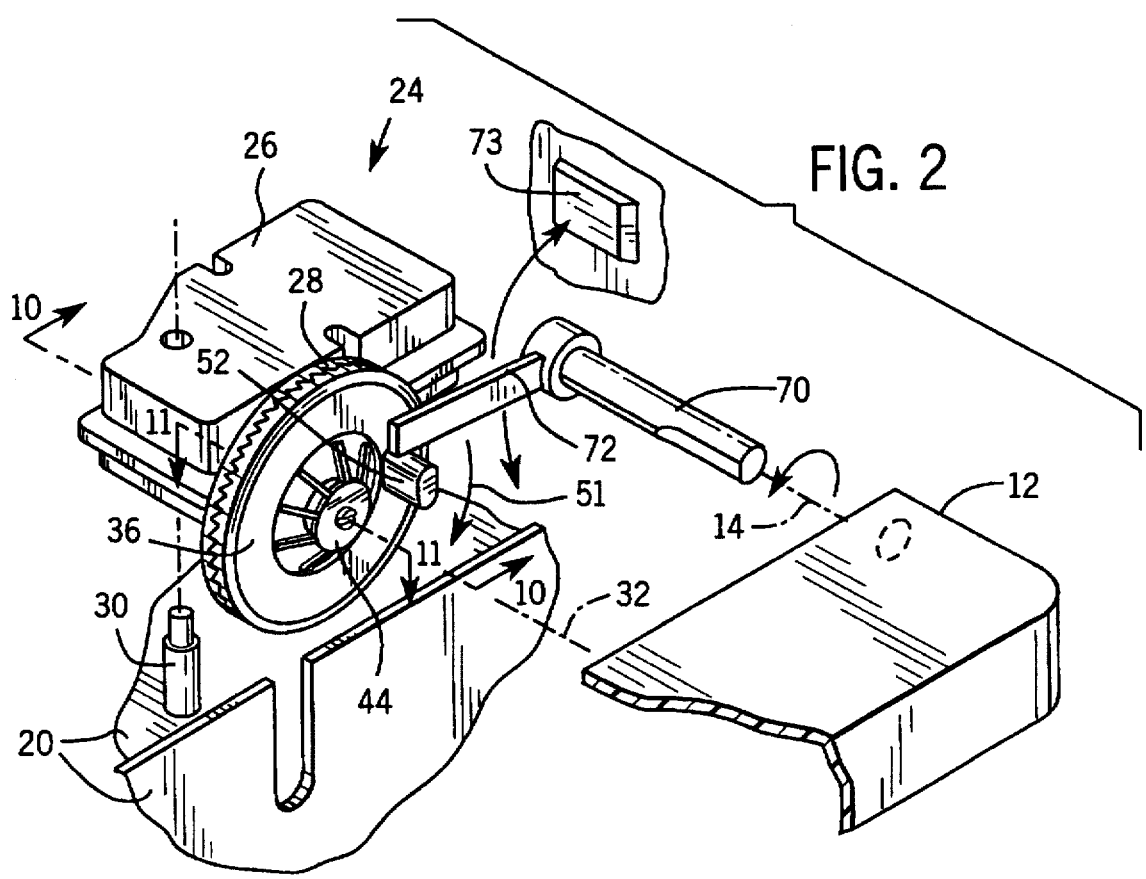

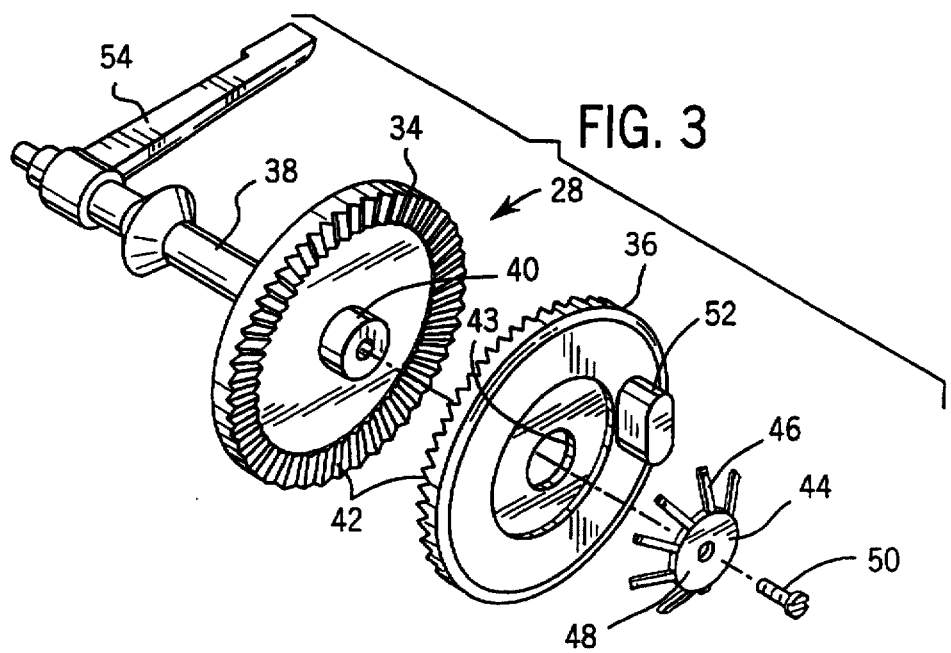
FIG. 3
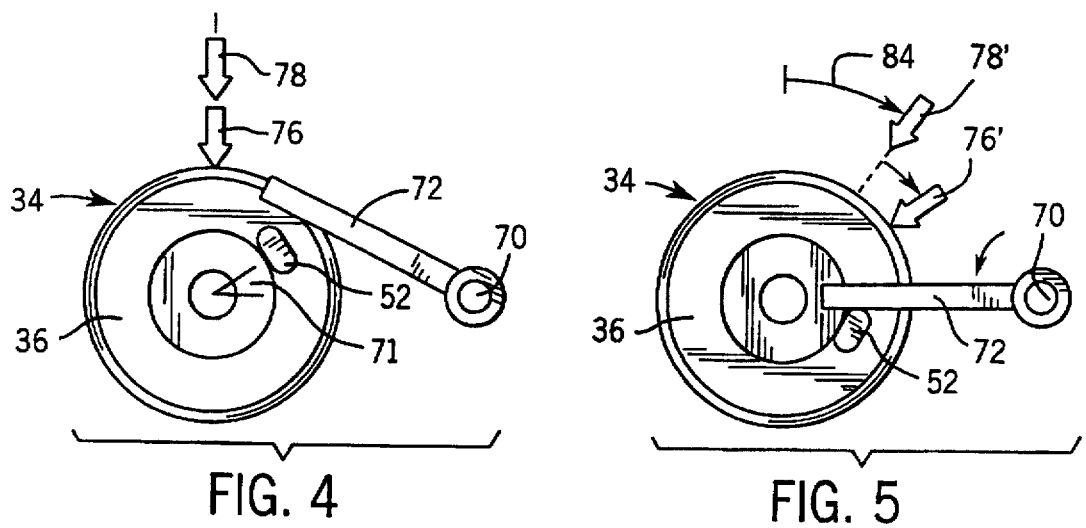
FIG. 4
FIG. 5
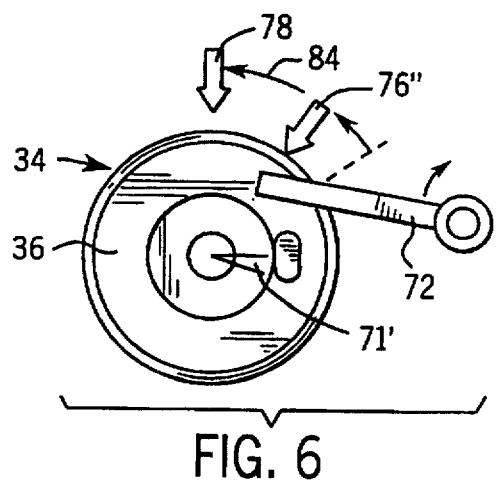
FIG. 6

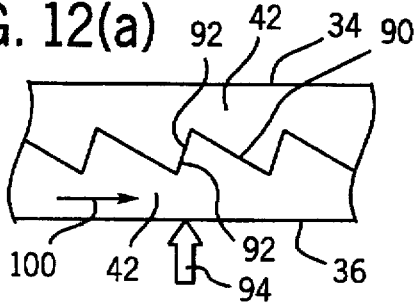
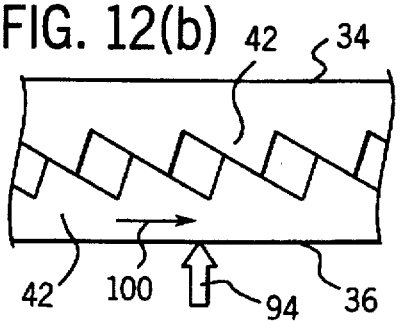
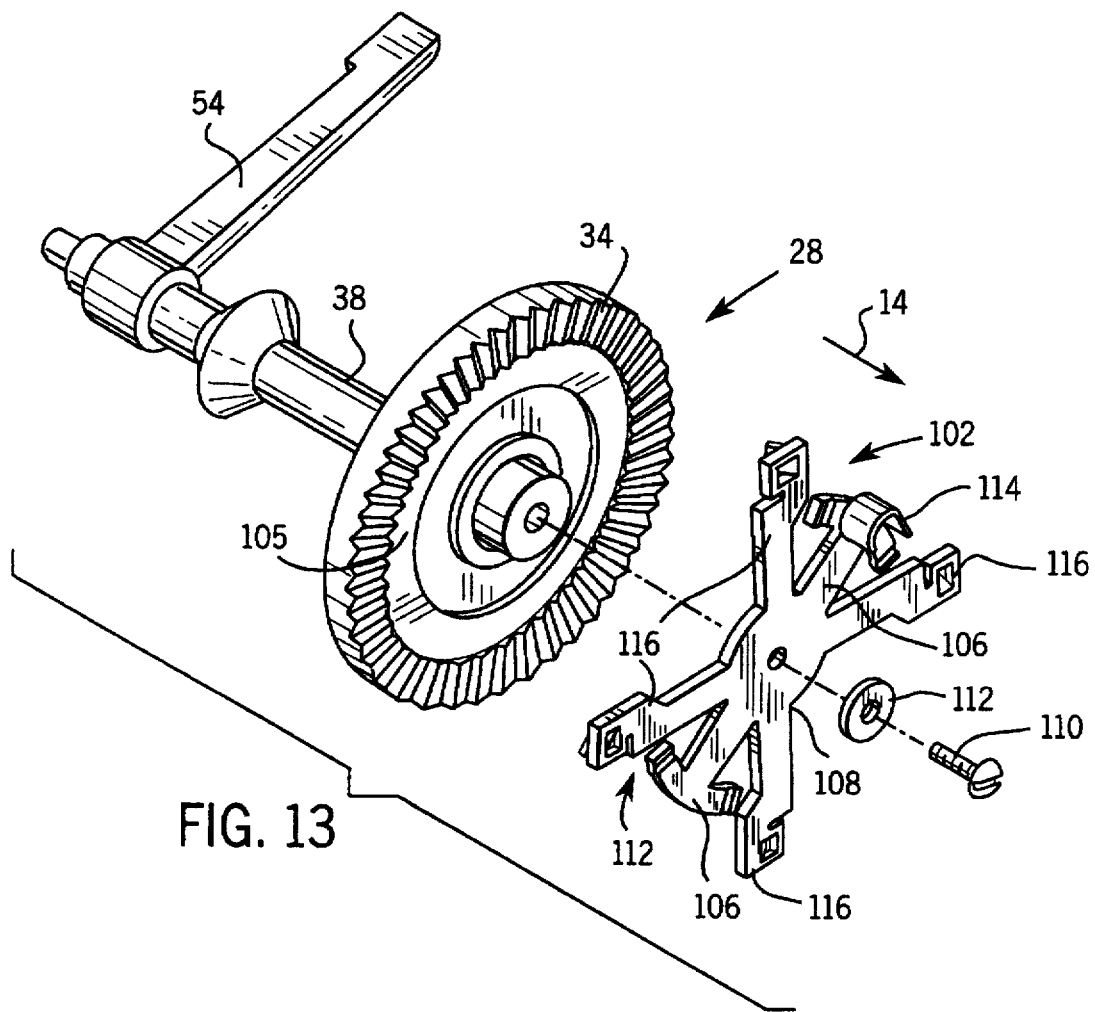
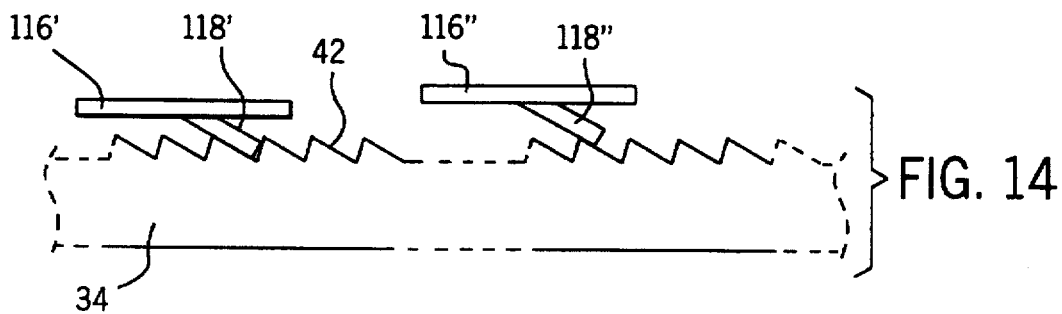

SELF ADJUSTING LID SWITCH

FIELD OF THE INVENTION

The present invention relates to clothes washing machines and the like and specifically to a switch for stopping a clothes washing machine when the lid is raised.

BACKGROUND OF THE INVENTION

During the spin cycle of the washing machine, when water is removed from the wet clothes centrifugally by spinning the clothes in a spin basket, it is important that the washing machine lid remain closed to prevent injury to the user. For this reason, the lid is normally connected to an electrical lid switch which stops the motion of the spin basket when the lid is raised.

It may be desirable to place the lid switch near the lid hinge for reasons of manufacturing convenience. At this position, however, there is very little motion of the lid when the lid is opened. As a result, even a slight misadjustment of the point at which the switch actuates may permit the lid to be opened an unacceptably large amount before the spin basket is stopped. Further, deformation of the linkage between the lid and the lid switch, caused, for example, by overextending the lid in the open position can result in unacceptably large opening of the lid before the washing machine is stopped.

SUMMARY OF THE INVENTION

The present invention provides a lid switch to be positioned near the hinge point of the lid that is self-adjusting to ensure that it will be reliably actuated upon a small and predetermined opening of the lid. The lid switch includes a slip joint which slides to set the connection between the switch and the lid when the washing machine lid is first closed. The actuation point of the switch in subsequent openings is thus set precisely with respect to the closed position of the lid.

Specifically, the invention includes an electric switch having contacts and an operator, the operator moving in a first direction to actuate the contacts at a switch actuation point, and moving in a second direction to de-actuate the contacts at a de-actuation point. A mechanical stop positioned with respect to the operator limits movement of the operator at a stop point in the first direction after the actuation point of the contacts so that the stop point is a predetermined distance from the de-actuation point. The operator is moved by the lid of the washing machine through a slip joint which allows slippage between the lid and operator at a predetermined force.

Thus, it is one object of the invention to make it practical to place a washing machine lid switch near the hinge point of the washing machine lid. The self-adjusting linkage ensures that the contacts will be de-actuated with a predetermined and small lifting of the lid.

The slip joint may be a first and second abutting plate rotatively mounted with respect to each other about an operator axis. One plate rotates with the first end of the slip joint and the other plate rotates with the second end of the slip joint. The plates are biased toward each other by a spring.

The plates may have inwardly facing and mutually engaging teeth and the teeth may have a first face with a steep slope with respect to the plane of the plates and a second face with a shallow slope with respect to the plane of the plates. The first faces of opposing teeth are positioned to press against each other with the closing of the lid.

Thus, it is another object of the invention to provide a slip joint that adjusts with the first closing of the lid at a precise point without over adjustment. Providing the teeth with a shallower face allows the biasing spring holding the plates together to be increased in pressure without increasing the torque necessary to cause the plates to slide with respect to each other. The increase in spring pressure reduces the possibility of teeth being skipped over in the adjustment process.

The foregoing and other objects and advantages of the invention will appear in the following description. The description is of a preferred embodiment which does not necessarily represent the full scope of the invention. The scope of the invention is described by the concluding claims.

BRIEF DESCRIPTION OF THE DRAWINGS

FIG. 1 is a perspective view of a top-loading washing machine;

FIG. 2 is an exploded perspective detail view of the lid of the washing machine of FIG. 1 and the switch assembly of present invention;

FIG. 3 is an exploded perspective view of a slip joint of the switch assembly at FIG. 2;

FIGS. 4 through 6 are diagrammatic representations of the slip joint of FIG. 3 before and after the first closing of the lid of the washing machine of FIG. 1;

FIGS. 12a and 12b are plan fragmentary views of the slip joint of FIG. 3 before and during slipping; respectively;

FIG. 13 is a figure similar to that of FIG. 3 showing an alternative embodiment of the slip joint;

FIG. 14 is a fragmentary detail view of the engaging of different teeth of the slip joint of FIG. 13 for a single position of the slip

DETAILED DESCRIPTION OF A PREFERRED EMBODIMENT

Figure 7:
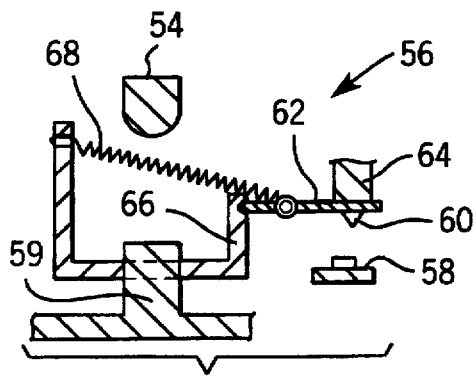
FIGS. 7 through 9 are cross-sectional views through the switch contacts of the switch assembly of FIG. 2 at progressive stages during the closing of the washing machine lid, taken along line 7—7 of FIG. 11 (described below)

Referring now to FIG. 1, a top-loading washing machine 10 includes a lid 12 hinged about a hinge axis 14. As shown the hinge axis 14 is parallel to the rear edge of the washing machine 10 and the lid 12 straddles a rearward console 20 extending upward from the washing machine 10, the console 20 providing washing machine controls and indicator lights 22.

As hinged, the lid 12 may move between a generally horizontal closed position (shown with solid lines) and a switch off position (shown with dotted lines), the switch off position being a predetermined distance 16 above the closed position and an angular displacement α above the closed position. When the lid 12 is raised above the switch off position, so indicated, the washing machine 10 should turn off and the spinning basket should stop rotation. Accordingly, the distance 16 is set by international safety standards to be small enough so as to prevent a user from reaching into the spinning tub (not shown) beneath the lid 12.

Referring now to FIG. 2, positioned under the console 20 is a switch assembly 24 of the present invention including a housing 26 providing an enclosure for various components to be described. The housing 26 fits upon a support pin 30 extending upward within the console 20 which together with a machine screw (not shown) serves to anchor the switch assembly 24 to the console 20 and hence to the washing machine 10.

Extending out from the housing 26 is a slip joint 28 mounted to a switch operator 38 (not shown in FIG. 2) which rotates generally about an operator axis 32 parallel to the hinge axis 14 when the switch assembly 24 is mounted to the console 20.

Figure 11:
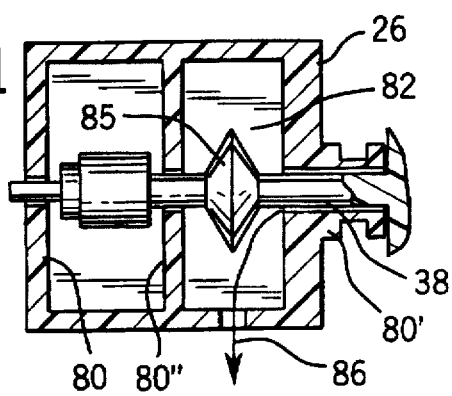
FIG. 11 is a cross-sectional view of the inverted switch assembly of FIG. 2 along Line 11—11 of FIG. 2.

Referring also to FIGS. 3 and 11, the slip joint 28 consists of two generally planar disks 34 and 36 co-axially mounted on the switch operator 38, that latter which is a shaft received through and supported by the housing 26, as will be described. Disk 34 is fixed to the switch operator 38 and has a central cylindrical boss 40 extending outward away from the switch operator 38 and the housing 26 to fit through a corresponding bore 43 in disk 36. Disk 36 may thus rotate with respect to disk 34 about its bore 43 on boss 40.

When disks 34 and 36 are assembled together, the boss 40 extends through the disk 36 to support a spider spring 44. Spider spring 44 has multiple flexible metal legs 46 attached to and extending radially from a central disk portion 48, the latter which is attached to the boss 40 by fastener 50. As so attached, the legs 46 extend inward toward the outer surface of disk 36 and press evenly downward against the outer surface of the disk 36 to press the disk 36 against the disk 34. Fastener 50 may be a machine screw or a stake-type fastener. It is the height of the boss 40 rather than the tightness of the fastener that serves to determine the spring force exerted on disk 36.

The inner opposing faces of disks 34 and 36 include mutually engaging teeth 42 arranged in rings on those surfaces as will be described below.

Extending axially outward from the outer surface of disk 36 is an eccentrically mounted crankpin 52 positioned so that tangential force on the crankpin 52 tends to rotate the disk 36. Such force, by virtue of the intermeshing of the teeth 42 on the disks 34 and 36 also tends to rotate disk 34 and hence switch operator 38.

Figure 10:
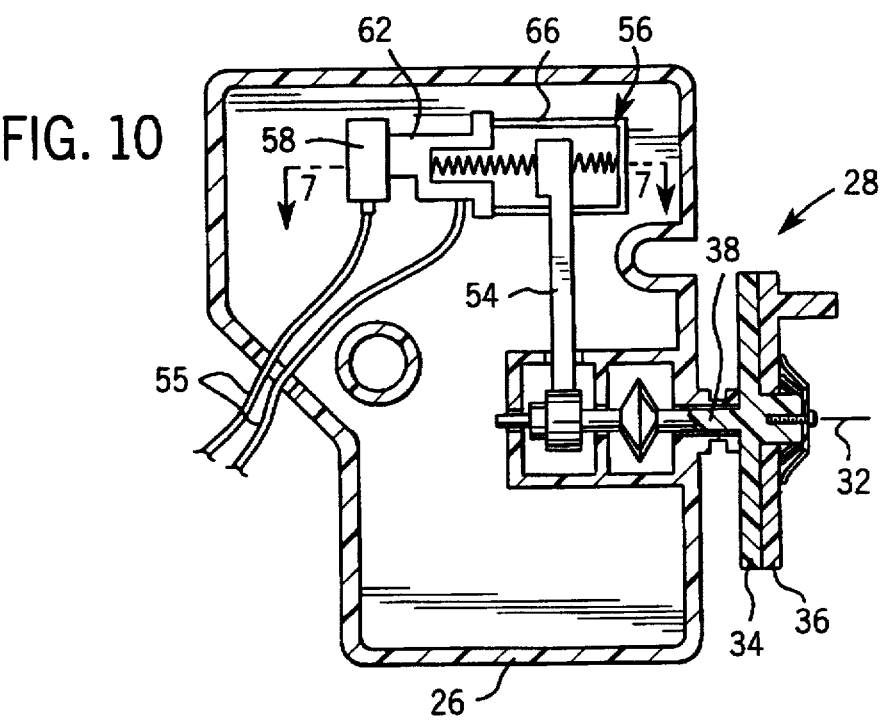
FIG. 10 is a cross-sectional view along Line 10—10 of FIG. 2.

Referring now to FIGS. 3 and 10 and 11 switch operator 38 passes inward into housing 26 and is attached at its inner end to an actuator lever 54 extending at right angles to the switch operator 38. The free end of the actuator lever 54 is positioned at a contact assembly 56 contained within housing 26. As positioned, rotation of the switch operator 38 moves the end of actuator lever 54 up or down to actuate the contact assembly 56.

Referring now to FIG. 7, a stationary contact 58 of the contact assembly 56 is positioned beneath a movable contact 60. The movable contact is in turn affixed to a blade 62 which is hinged to rest against an upper stop 64 at an upward position away from the stationary contact, but to contact the stationary contact 58 at a lower position.

The hinging action of blade 62 is provided by a knife edge at the one end of the blade 62 received by a groove cut in a first vertical wall of a U-shaped mounting bracket 66. A second vertical wall of the mounting bracket 66, positioned behind the first vertical wall with respect to the blade 62, provides an attachment point for one end of a coil spring 68. The other end of the coil spring 68 is attached to blade 62 so that tension by the spring 68 pulls the blade 62 into engagement with the first vertical wall, the knife edge resting in the groove as described. Prior to actuation by the actuator lever 54, the spring 68 provides a slight upward bias to the blade 62 causing it to rest against the upper stop 64.

Figure 8:
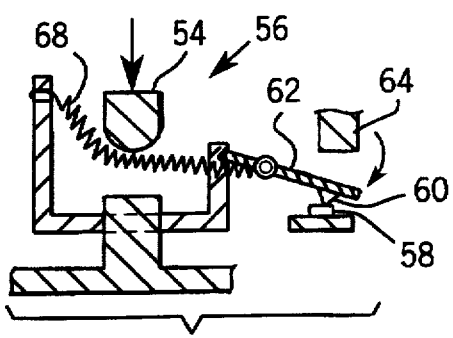

Referring now to FIGS. 2 and 8, rotation of the switch operator 38 in a clockwise direction 51 causes the end of actuator lever 54 to press down on a middle portion of the spring 68 between the first and second walls of the mounting bracket 66, in turn causing the upward bias on blade 62 to become a downward bias which swings blade 62 downward until contact 60 touches stationary contact 58 permitting current flow therebetween. Referring momentarily to FIG. 11, wires 55 connect to the stationary contact 58 and to the mounting bracket 66 (which is conductively connected through the blade 62 to the movable contact 60 to provide a switched electrical current that may be used to enable the washing machine 10 when the lid is closed. Accordingly, the position of the contact assembly 56 shown in FIG. 8 is termed an actuation point because it actuates the washing machine 10.

Figure 9:
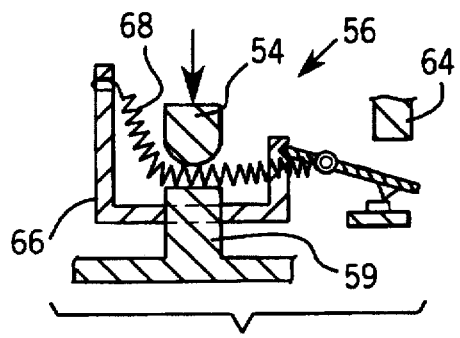

Referring now to FIG. 9, further motion of actuator lever 54 downward with clockwise rotation of the switch operator 38, causes additional downward movement of the spring 68 in overtravel until the middle portion of the spring 68 strikes a lower stop 59 extending upward through the mounting bracket 66. At this stop point, further motion of the actuator lever 54 downward is no longer possible. In an alternative embodiment, the downward motion of the lever 54 is stopped directly by a molded portion of the housing 26 extending upward to the side of the spring 68.

The actuator lever 54 may then rise sufficiently that blade 62 swings upward again as shown in FIG. 7. The position of the actuator lever 54 where the contacts 58 and 60 first separate is the de-actuation point, because it is the point at which the spin basket of the washing machine 10 is stopped.

Referring now to FIG. 2, lid 12 engages a hinge pin 70 about which the lid 12 rotates. The hinge pin 70 rotates about the hinge axis 14 with movement of the lid 12 between the up and down positions. Extending perpendicularly from a free end of the hinge pin 70 is an actuating arm 72 which, with closing of the lid 12, rotates to strike the crankpin 52 on the slip joint 28, thereby rotating the slip joint 28 in the clockwise direction 51.

Referring also to FIG. 4, when the switch assembly 24 is first installed in the washing machine 10, the crankpin 52 is positioned at an elevated angle 71 as a result of a pre-set alignment between disks 34 and 36 indicated by arrows 76 and 78 respectively. At this time disk 34 is in the de-actuation point (reflecting the state of the contact assembly 56 described above).

When the lid 12 is first closed, as shown in FIG. 5, the actuating arm 72 pushes down on the crankpin 52 causing clockwise rotation of both disks 36 and 34 linked by their interengaging teeth 42. The rotation continues for an angle 84 until the position 78' of disk 34 reaches the stop point and can rotate no further. Disk 36 however continues to rotate further to position 76' motion that causes slippage between the teeth 42 on disks 34 and 36. At this point disks 36 and 34 have slipped with respect to each other so that the switch operator 38 is at the stop point when the lid 12 has been fully closed.

Referring now to FIG. 6, the slippage between disks 36 and 34 ensures that disk 34, when the lid 12 is opened, is no more than a relatively small angle 84 away from a de-actuated point indicated by arrow 78. Thus, the minimum rotation of actuating arm 72 in the clockwise direction (and counterclockwise rotation of the switch operator) caused by an opening of the lid 12, is necessary to return the switch operator 38 to the de-actuation point and to turn off the washing machine 10.

When the lid 12 is lifted, the crankpin rises to angle 71' less than angle 71.

The angle 84 between the stop point and the de-actuation point determines how far the lid 12 must opened in order to stop the washing machine 10. Thus, it can be understood that the accumulated tolerances in the relative angle between the actuating arm 72 and the lid 12; and the positioning of the contact assembly 56 with respect to the console 20, and hence with respect to the lid 12, are largely removed by relative slippage between disks 36 and 34. The height of the lower stop 59, shown generally in FIGS. 7 and 9, may be readily adjusted within the contact assembly 56 to control the distance 16 (shown in FIG. 1) by which the lid 12 may be lifted before stopping the washing machine 10, without concern for these accumulated tolerances.

Referring now again to FIG. 2, the actuating arm 72 may support the lid 12 in its fully open position, the end of actuation arm 54 abutting a stop 73. In the open position, further opening of the lid 12 can twist the hinge pin 70 or bend the actuating arm in the clockwise direction. Cold flow of the material of the hinge pin 70 under the torque of the open lid 12 can have the same effect. Such distortion of the linkage between the lid 12 and the switch assembly 24 could permit the lid 12 to subsequently be raised by more than the maximum allowable distance 16 without de-activation of the switch assembly 24. The slippage between disks 34 and 36, however, ensures that when the lid 12 is closed that the switch assembly 24 re-adjusts to any change in position of the actuation arm 72 with respect to the lid 12 so that the opening distance 16 is not exceeded.

Referring now to FIGS. 11 and 10, the switch operator 38 is supported by multiple bearing surfaces on walls 80 and 80', 80' forming all outside wall of the housing 26. A third wall 80" is positioned between the walls 80 and 80' and forms with wall 80' an enclosed chamber 82 positioned just inside the housing 26 where the switch operator 38 enters the housing 26. In this chamber 82, the switch operator 38 expands in diameter to form a drip ridge 85. Water passing through the bearing surface on wall 80' of the housing 26 is conducted along the switch operator 38 to this drip ridge 85 and is blocked from proceeding further into the housing 26 by the inability of water to flow upward off of the drip ridge 85. Water accumulating on the drip ridge 85 drops off of the drip ridge 85 into the chamber 82 and is conducted through a drain port cut in the housing 26 at its bottom surface 86. In this manner, water is conducted harmlessly away from the inner portions of the switch assembly and in particular away from the contact assembly 56 contained therein.

Referring now to FIGS. 12(a) and 12(b), the teeth 42 at the mating faces of disks 34 and 36 have a sawtooth shape in which a first face 90 of each tooth has a low slope with respect to the plane of the disks 34 and 36 and a second sloped face 92 of each tooth has a high slope with respect to the planes of the disks 34 and 36. During rotation of the disk 36 by actuating arm 72 (during closing of the lid door 12) the low slope faces 90 of the teeth 42 press against each other. After the stop point is reached, further rotation of disk 36 causes the disks 34 and 36 to separate against the restoring force 94 of the spring 44 in response to a breaking torque 100 between the disks 34 and 36.

The slope of faces 90 of the teeth 42 determines the relationship between the breaking torque 100 necessary to cause slippage between disks 34 and 36 and the restoring force 94, e.g., shallower slope of teeth faces 90 lowers the breaking torque 100 for a given restoring force 94.

In the present invention, the shallower sloped faces 90 allow the use of a greater restoring force 94 without increasing the breaking torque 100. This greater restoring force 94 prevents the disks 34 and 36 from separating sufficiently to cause the skipping of teeth during the first closing of the lid 12 during the adjustment process of the switch assembly. It is believed that this skipping of teeth may be exacerbated by the fact that disk 34, by virtue of the stretching of spring 68 acting on actuator lever 54, is spring biased to jump forward when the teeth 42 first disengage during adjustment.

In order to preserve the fine increment of adjustment determined by the pitch of the teeth, faces 92 are steeper so that the spacing between teeth remains the same despite the lower slope of faces 90.

Figure 15:
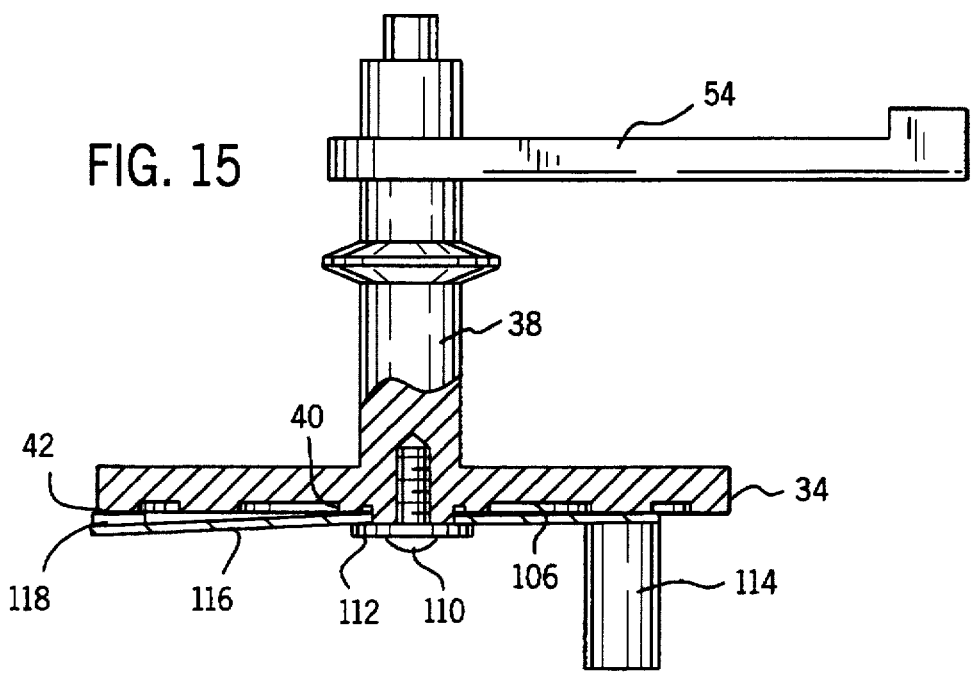
FIGS. 15 and 16 are top and front elevation views of the slip joint of FIG. 13.
Figure 16:
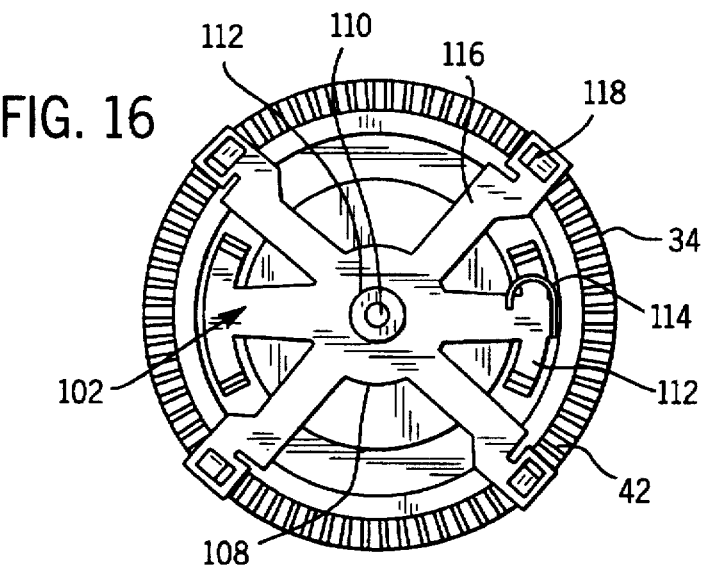

Referring now to FIGS. 13, 15 and 16, in a second embodiment, the disk 36 and spider spring 44 are replaced with a stamping 102 combining the functions of the disk 36 and spider spring 44 in a single unit. Stamping 102 has opposed flexible metal legs 106 attached to and extending radially from a central disk portion 108. A hole in the center of the disk portion 108 receives a fastener 110 and washer 112 which attach the stamping 102 to a shortened boss 40 at the center of the disk 34 to rotate about the fastener 110 captured between the washer 112 and the boss 40.

In this embodiment, disk 34 is modified to include a circular raceway 106 positioned inside the ring of the teeth 42 and presenting a smooth surface along which arcuate skis 112 at the ends of the arms 106 may slide as the stamping 102 rotates about the fastener 110. The skis 112 are pressed against the smooth surface of the raceway by the force of the inwardly flexing arms 106.

Figure 17:
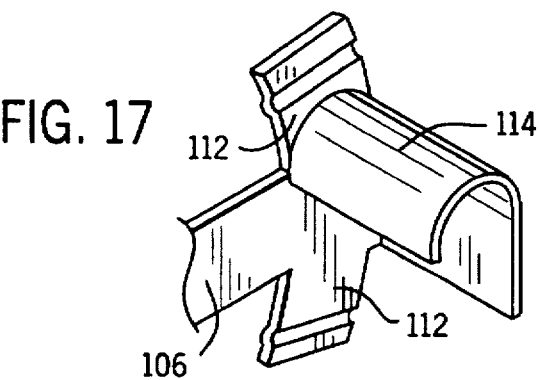
FIG. 17 is a detail view of a crank pin on the slip joint of FIG. 13 against which force is applied by the closing of the washer lid.

Referring also to FIG. 17, positioned on one ski 106 and extending along hinge axis 14 is a crankpin 114 of similar dimensions and purpose as crankpin 52 described previously. The ski 112 beneath the crankpin 114 serves to stabilize the crankpin 114 against twisting of the arms 106 in response to the force on the crankpin 114 by the actuating arm 72. The ski 112 opposite the crankpin 114 serves to balance the force exerted on the fastener by the ski 112 under the crankpin 114.

The stamping 102 also includes four radially extending teeth supporting arms 116 spaced at equal angles about disk portion 108 and attached at one end to the disk portion 108 to extend outward over teeth 42 of the disk 34. The teeth supporting arms 116 flex inward to press against teeth 42.

Referring now also to FIG. 14, the ends of the teeth supporting arms 116 over the teeth 42 and have stamped barb teeth 118 extending inward from their surface adjacent to the teeth 42 to engage the teeth 42 in the manner of the teeth 42 previously described with respect to disk 36. The barb teeth 118' on a first opposed two of the teeth supporting arms 116' are positioned to engage the trough of two teeth 42 when the barb teeth 118" on a second opposed two of the teeth supporting arms 116" are positioned to engage the slopes of teeth 42. Thus a detent action will occur at increments of angular motion between the stamping 102 and the disk 34 equal to one-half of the spacing between teeth 42 (as opposed to one spacing between teeth 42 as is the case with the embodiment of FIG. 3). Thus, limits in how small the pitch of teeth 42 may be, caused by, for example, flow characteristics of injection molded plastics, may be overcome. It will be understood that additional teeth supporting arms 116 with barb teeth 118 with different relative spacings with respect to the teeth 42 may be provided to further subdivide the fundamental pitch of the detent action.

The stamping 102 may be formed as one piece for example from spring stainless steel eliminating the need for disk 36 and spider spring 46.

In order to apprise the public of the various embodiments that may fall within the scope of the invention, the following claims are made.

I claim:

1. A switch assembly for a top-loading washing machine or the like having a lid hinged about a hinge axis at one edge to open and close between a closed position with the lid substantially aligned with a top surface of the washing machine, and an switch off position where a second edge of the lid opposite the hinged edge is raised with respect to a position of said second edge when the lid is closed, the switch assembly comprising:

a) a electric switch having contacts and an operator, the operator moving in a first direction to actuate the contacts at a switch actuation point and moving in a second direction to de-actuate the contacts at a de-actuation point;

b) a stop positioned with respect to the operator to limit movement of the operator at a stop point in the first direction after the actuation point of the contacts, the stop point being a predetermined distance from the de-actuation point; and c) a twist joint having a first and second end twisting with respect to each other only upon an occurrence of a first predetermined force between the first and the second end, the first end connected with the lid to move with opening and closing of the lid and the second end connected with the switch operator to move the switch operator in the first direction with closing of the lid and to move in the second direction with opening of the lid;

whereby a first closing of the lid causes twisting of the twist joint after the switch operator reaches the stop point; and whereby the opening of the lid after the first closing causes the operator to move in the second direction past the de-actuation point before the lid has opened by a predetermined amount.

2. The switch assembly of claim 1:

wherein the lid includes a shaft extending inward along the hinge axis and having a radially extending lever; and wherein the twist joint rotates about an operator axis parallel to the hinge axis to move the operator; and wherein the first end of the twist joint includes a crank pin offset to the operator axis; and wherein the first end of the twist joint connects to the lid by means of an abutting of the crank pin with the radially extending lever.

3. The switch assembly of claim 1 wherein the twist joint comprises first and second abutting plates mounted rotatably with respect to each other about an operator axis, one of the first and second plates rotating with the first end of the twist joint and the other of the first and second plates rotating with the second end of the twist joint, the plates biased toward each other by a spring.

4. The switch assembly of claim 3 wherein the plates each have inwardly facing and mutually engaging teeth.

5. The switch assembly of claim 4 wherein the teeth are arranged on each plate in a ring about the operator axis and wherein the teeth have a first face with a steep slope with respect to a plane of the plates and a second face with a shallow slope with respect to the plane of the disks, wherein the first faces are positioned to press against each other with closing of the lid.

6. The switch assembly of claim 3 wherein the plates each have multiple sets of inwardly facing and mutually engaging teeth and wherein at least one set of said teeth on each plate is engaged with teeth troughs at a time another set of said teeth on each plate is not engaged with other teeth troughs.

7. The switch assembly of claim 3 wherein one of said first and second plates is a flexible metal stamping.

8. The switch assembly of claim 7 wherein the flexible metal stamping includes a plurality of radially extending flexible arms formed to press inward against the other of said first and second plates, an end of one radially extending flexible arm supporting the crank pin.

9. The switch assembly of claim 7 wherein the one radially extending flexible arm supporting the crank pin includes a ski extending along a plane of the one of said first and second plates and wherein the other of said first and second plates, includes a smooth track supporting the ski during rotation of the plates with respect to each other.

10. The switch assembly of claim 7 wherein the flexible metal stamping includes a plurality of radially extending flexible arms formed to press inward against the other of the first and second plates, ends of the arms supporting some of the mutually engaging teeth.

11. The switch assembly of claim 3 wherein the first plate includes an axially extending boss received by a bore in the second plate to extend therethrough when the first plate abuts the second plate and wherein the spring is a metallic leaf spring mounted to the boss and having at least two flexible metal leaves bending inward from the boss to press on the outer surface of the second plate thereby sandwiching the second plate between the leaves and the first plate.

12. The switch assembly of claim 3 wherein the lid includes a shaft extending along the hinge axis and having a radially extending lever; and wherein the first plate includes an outwardly extending crank pin offset to the operator axis; and wherein the first end of the twist joint connects to the lid by means of an abutting of the crank pin with the radially extending lever.

13. The switch assembly of claim 3 wherein the operator is supported to rotate about within a switch housing surrounding the switch contacts and wherein the operator includes a drip ridge positioned within the housing having a greater diameter than the operator shaft on either side of the drip ridge and wherein the housing includes a chamber surrounding the drip ridge, the chamber having a drain hole in a bottom surface thereon.

14. A switch assembly for a top-loading washing machine or the like having a lid hinged about a hinge axis at one edge to open and close between a closed position with the lid substantially aligned with a top surface of the washing machine, and a switch off position where a second edge of the lid opposite the hinged edge is raised with respect to a position of the second edge when the lid is closed, the switch assembly comprising:

a) a rotary electric switch having contacts and an operator rotating about an operator axis parallel to the hinge axis in a first direction to close the contacts at a switch closing point and rotating in a second direction to open the contacts at a switch open point b) a stop positioned with respect to the operator to stop the operator at a stop point from further rotation in the first direction, the stop point being a predetermined distance from the switch open point; and c) a twist joint having first and second plates abutting rotatably with respect to each other about the operator axis, the plates each having inwardly facing and mutually engaging teeth, one of the first and second plates rotating with a first end of the twist joint and the other of the first and second plates rotating with a second end of the twist joint, the plates biased toward each other by a spring, the first plate connected with the lid to rotate with opening and closing of the lid and the second plate connected with the switch operator to rotate the switch operator in the first direction with closing of the lid and to move in the second direction with opening of the lid;

whereby a first closing of the lid causes twisting between the plates after the switch operator reaches the stop point; and whereby the opening of the lid after the first closing causes the operator to move in the second direction past the de-actuation point before the lid has opened by a predetermined amount.

* * * * *